Figure 1:
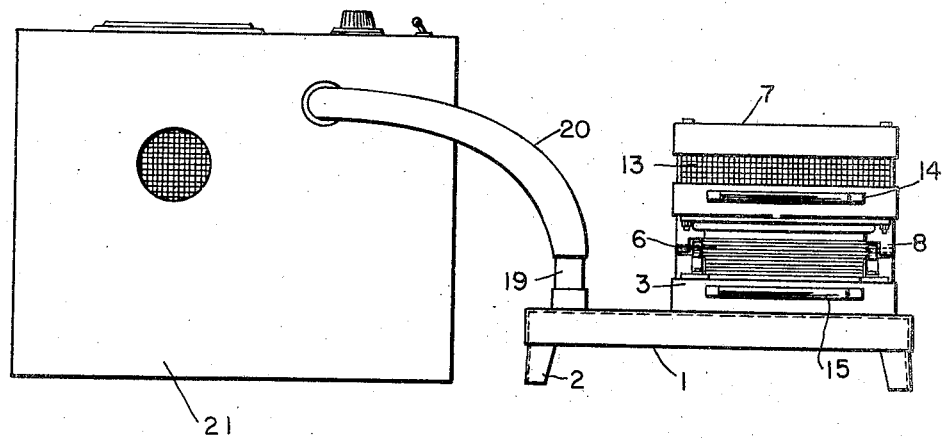

May 25, 1948.　　　H. E. TREMAIN　　　2,442,187
GAS MASK CANISTER TESTER
Filed March 16, 1945　　2 Sheets-Sheet 1

INVENTOR.
Henry Earl Tremain
BY *William R. Day*
ATTORNEY

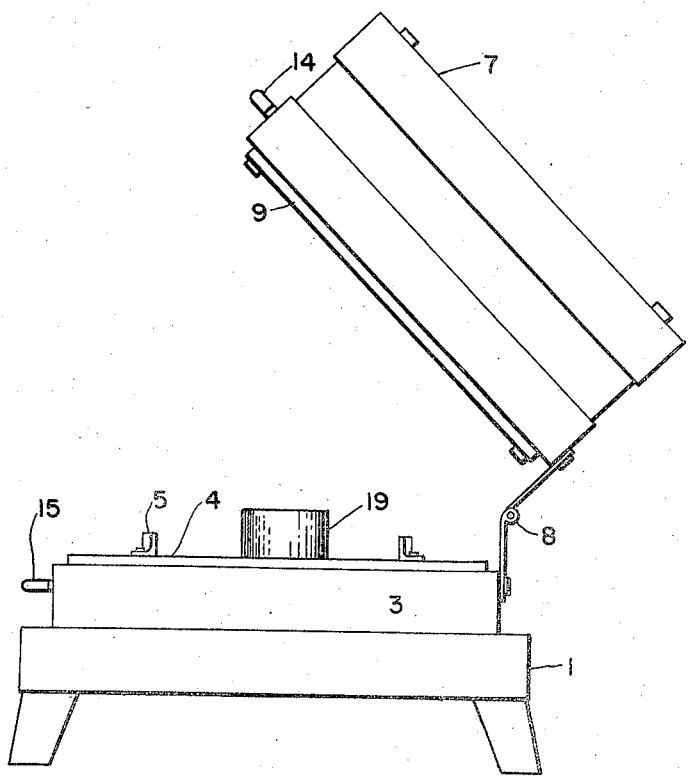
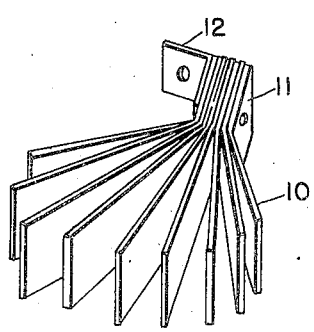
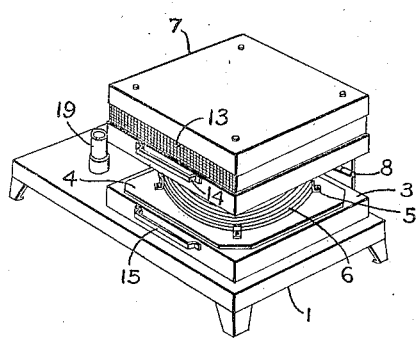

Patented May 25, 1948

2,442,187

UNITED STATES PATENT OFFICE 2,442,187

GAS MASK CANISTER TESTER

Henry Earl Tremain, Wyandotte, Mich., assignor to Wyandotte Chemicals Corporation, Wyandotte, Mich., a corporation of Michigan Application March 16, 1945, Serial No. 583,067

3 Claims. (Cl. 73—38)

The present invention relates to a device for testing the operating efficiency of a canister or cartridge employed in gas masks. My device is particularly suited to the testing of such a cartridge as is used for protection against mercury vapor. Mercury vapor gas masks find considerable use in such chemical and metallurgical industries as chlorine plants, plants manufacturing mercury compounds, mercury mines and mercury refining plants, and in electrical manufacturing plants where metallic mercury is employed as in the manufacturing of mercury switches and lamps; and for the purpose of protecting the health and safety of the workmen against the hazard of inhaling mercury vapor. Heretofore, when the canister or cartridge has lost its ability to absorb mercury vapor efficiently or to counteract it to prevent its inhalation into the human body, the likelihood of the workmen continuing to wear the gas mask with the ineffective cartridge has been very great for the main and simple reason that no means has been provided for determining when failure occurs.

It is, therefore, the general object and nature of my invention to provide a device, relatively simple and economical in structure, and capable of facile use, even by the most relatively unskilled operator, whereby the cartridge may be tested to determine whether it remains operative, and thus capable of protecting the health and safety of the person using it.

A further object of my invention is to provide a simple and convenient device for evaluating the life or sorptive capacity of gas absorbers under any desired flow rates, temperatures or other conditions of operation.

Another object of my invention is to provide a source for generating mercury vapor, which source forms an integral and assembled part of the testing device itself. A pool of mercury vapor constitutes the simplest form of such a generating source, but is subject to the objection of the possibility of spillage, as well as requiring a relatively large investment in a costly material, particularly when the testing device is to be manufactured in relatively large quantities. My invention provides a mercury vapor generating source, in the form of a mercury wetted or amalgamated metallic surface, and incorporated as a part of the testing device, such mercury vapor generating source functions as a means for conveniently and economically generating mercury vapor against which the gas mask canister or cartridge is to be tested for its proof against passage of such vapor.

To the accomplishment of these and additional objectives and to enable any person skilled in the art readily to understand and practice the invention, the following full and concise description and annexed drawing set forth the best mode in which I have contemplated applying the principle thereof.

Figure 3:
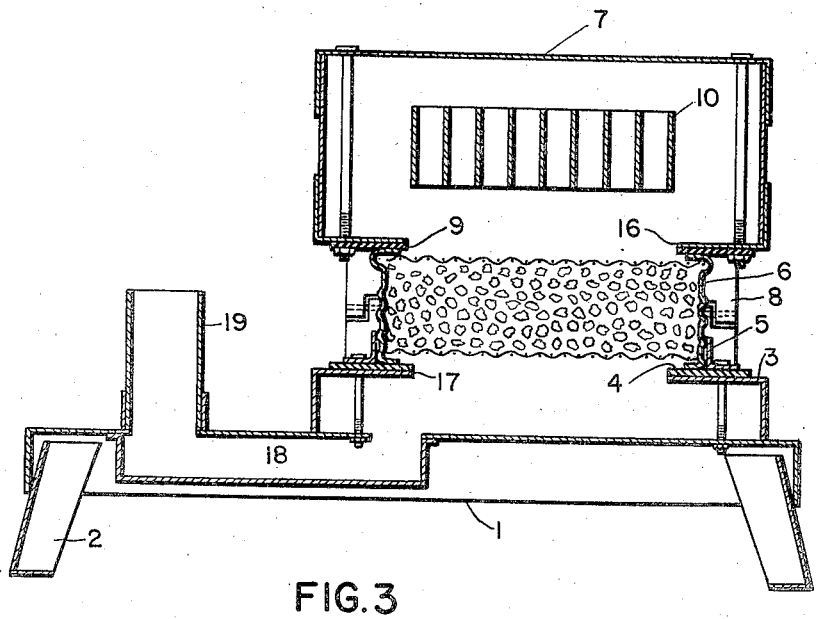

In said annexed drawing Fig. 1 is an elevational view of a gas mask canister testing device constructed according to the principles of my invention and assembled for use in conjunction with a mercury vapor detector, Fig. 2 is a perspective view of my testing device, Fig. 3 is a sectional view thereof, Fig. 4 is an elevational view showing the upper clamping member in open position, and Fig. 5 is a detailed perspective view of the mercury-wetted vanes serving as the source for generating the mercury vapor.

Now referring more particularly to the drawing, the testing device shown therein comprises a supporting base 1 which may be suitably mounted upon legs such as indicated at 2 and having the hollow platform 3 which presents an upper horizontal surface for the reception of the gas mask cartridge which is to be tested. A washer or gasket 4 of resilient material, such as rubber, is mounted on the top of the platform 3 and the guide brackets 5 are in turn located on top of the washer 4, whereby the cylindrical canister or cartridge 6 (of customary construction as used in gas masks) can simply be rested upon the top of the gasket 4 and held in proper aligned position by the guide brackets 5.

An upper clamping member 7 which is of box-like form with a hollow interior, is hinged to the platform 3 by means of the piano or any suitable type hinge 8. The upper clamping member 7 also carries a gasket 9 on its lower or bottom side. Thus, when the cartridge 6 is inserted into the testing device, the clamping member 7 is swung to its lowered or closed position, and such cartridge is held in a clamped position, with the flanges on its opposite sides sealed to the outside atmosphere.

A series of metal strips, of a mercury-wettable material 10 such as iron, zinc, copper, silver or "Monel" metal, and having their surfaces wetted or amalgamated with mercury, are assembled in a fan-like or any convenient arrangement, being clamped together as indicated in 11 and mounted by means of the bracket 12 upon the inside vertical wall of the clamping member 7. One vertical side wall of the clamped member 7 is open to the atmosphere and covered by suitable grill work or screen, such as indicated at 13.

Holding or manipulating handles 14 and 15 are conveniently provided on the front side of the members 7 and 3 respectively.

An opening as indicated at 16 is provided in the bottom wall of the member 7, and a similar opening 17 is provided in the top wall of the platform 3. A passageway 18 leads from the interior of the hollow platform 3 to the riser or tube connection 19 which in turn is connected to the flexible tube 20 leading to the mercury vapor detector 21.

The operation of the above described device is quite simple and is outlined substantially as follows:

The cartridge 6 is removed from the gas mask, placed on the platform 3 and the upper clamping member 7 moved to a closed position. Air is drawn or led in through the opening 13 past the mercury-wetted vanes whereby mercury vapor is entrained in the incoming air stream. This air stream then passes through the air opening 16, through the interior of the cartridge 6, thence through the opening 17 to the passageway 18 and through the connection 19 and through 20 to mercury vapor detector 21. If the latter registers the presence of mercury vapor, it is thereby immediately indicated that the cartridge 6 is no longer operative nor fit for use in the gas mask and hence subject to be discarded. On the other hand, if the detector 21 fails to indicate the presence of mercury vapor, it means that the cartridge 6 is still functioning properly.

The American Standards Association has established the maximum limit of concentration of mercury vapor of 1 milligram per 10 cubic meters of air in the atmosphere of working places as that which is safe for the health of workers. Thus, if the mercury vapor detector shows a concentration greater than this standard specification to be passing through the cartridge under test, the latter is no longer safe.

It is recommended that the actual entrainment of mercury in the air stream drawn into the testing device be checked from time to time by the insertion of a blank canister or cartridge in place of the filled cartridge 6. If the mercury vapor detector 1 then shows the presence in the air stream of more than the safe, maximum amount of mercury vapor, this will mean that the mercury generating source is functioning properly and suitable for the actual test of the cartridge 6.

From the foregoing description of my invention it should be equally apparent to those skilled in the art that my testing device can also be readily adapted to the testing of gas mask canisters and cartridges for the absorption of other poisonous, toxic and noxious gases, such as carbon monoxide, carbon dioxide, fluorine, hydrogen sulfide, etc., and particularly those gases whose presence would not likely be detected by the unaided physical senses of the person subjected to them. Such an equivalent adaptation will, of course, involve the use of a different type of a gas detector than the mercury vapor detector 21 herein shown and described; and also the entrainment in the incoming air stream passing through the testing device, of the particular gas against which the canister or cartridge is to be tested.

Other modes of applying the principle of my invention, in addition to the one herein and above described and illustrated in detail, may be employed, provided the structural elements stated by any of the following claims or the equivalent of such elements be utilized.

I, therefore, particularly point out and distinctly claim as my invention and discovery:

1. A device for testing the operability of a gas mask cartridge comprising a hollow supporting base having a horizontal surface for receiving the cartridge in surface-to-surface contact thereon, a hollow, hingedly mounted upper member on said base and spaced therefrom, when in horizontal position, a distance substantially equal to the thickness of said cartridge, said upper member having a surface adapted to contact the upper side of said cartridge, said upper member having an opening in its side wall to the atmosphere, and a conduit leading from the interior of said base, said horizontal surface of said supporting base and said surface of said upper member each having openings therein placing the interior of said supporting base and of said upper member, respectively, in communication with said cartridge when the device is in operative position.

2. A device for testing the operability of a mercury vapor absorbing gas mask cartridge comprising a hollow supporting base having a horizontal surface for receiving the cartridge in surface-to-surface contact thereon, a hollow, hingedly mounted upper member on said base and spaced therefrom, when in horizontal position, a distance substantially equal to the thickness of said cartridge, said upper member having a surface adapted to contact the upper side of said cartridge, said upper member having an opening in its side wall to the atmosphere, a conduit leading from the interior of said base, and a plurality of mercury-wetted vanes located within said upper member, said horizontal surface of said supporting base and said surface of said upper member each having openings therein placing the interior of said supporting base and of said upper member, respectively, in communication with said cartridge when the device is in operative position.

3. A device for testing the operability of a mercury vapor absorbing gas mask cartridge comprising the combination of a hollow, horizontal supporting member upon which the cartridge to be tested is adapted to rest, an upwardly swingable clamping member hinged to said supporting member, each of said members having a hollow interior communicating with opposite sides of said cartridge when the latter is clamped therebetween, a conduit leading to the interior of one of said members, the other of said members having an opening to the atmosphere, and a mercury-surface-wetted element mounted within one of said clamping members.

HENRY EARL TREMAIN.

REFERENCES CITED

The following references are of record in the file of this patent:

UNITED STATES PATENTS

| Number | Name | Date |
|---|---|---|
| 2,072,872 | Finkelstein | Mar. 9, 1937 |
| 2,197,909 | Wendler | Apr. 23, 1940 |
| 2,355,858 | Hahn et al. | Aug. 14, 1944 |